Figure 1:
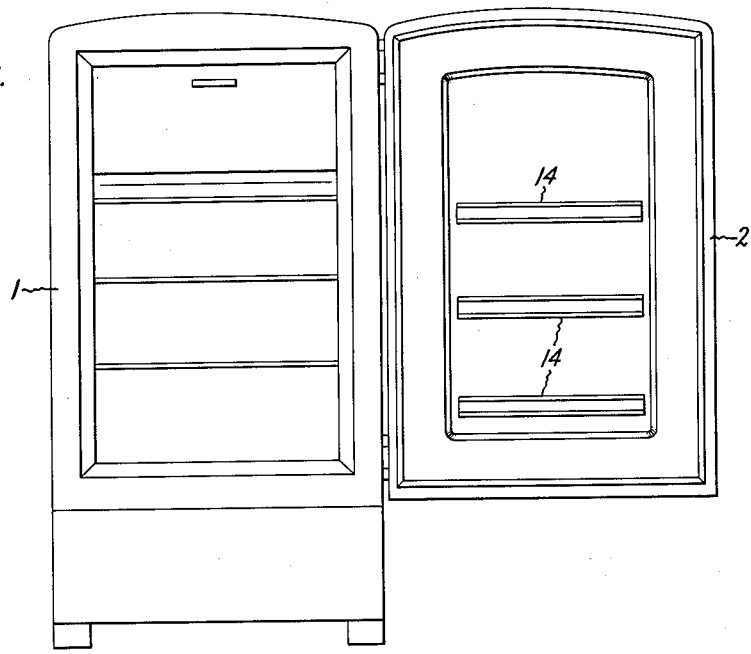

Jan. 3, 1956  R. A. KING  2,728,958

INSULATING STRUCTURE

Filed Oct. 23, 1952

Inventor:
Robert A. King,
by (signature)
His Attorney.

United States Patent Office 2,728,958
Patented Jan. 3, 1956

2,728,958

INSULATING STRUCTURE

Robert A. King, Erie, Pa., assignor to General Electric Company, a corporation of New York Application October 23, 1952, Serial No. 316,436

3 Claims. (Cl. 20—35)

My invention relates to insulating structures and more particularly to insulating structures including an evacuated space.

Vacuum insulating structures, that is, structures including an evacuated space, may conveniently be employed for the insulated walls of refrigerator cabinets and the like, since such structures, because of improved insulating properties, make possible the employing of much thinner walls with correspondingly increased storage space within the refrigerator cabinet. These structures may be made in the form of a sealed envelope including an appropriate supporting filler material therein, for example, in accordance with the invention described and claimed in the copending application of Herbert M. Strong and Francis P. Bundy, Serial No. 236,788 filed July 14, 1951, and assigned to the General Electric Company, the assignee of the present invention. It is to be understood that my invention is an improvement over the invention of the Strong and Bundy application, and therefore, I do not claim as my invention anything shown or described in said Strong and Bundy application, which is to be regarded as prior art with respect to the present application. In some cases, the Strong and Bundy structures may be employed between the outer shell and the inner liner of a conventional refrigerator, being in such cases inserted between the outer shell and the inner liner in lieu of conventional insulation presently employed. However, this fails to take full advantage of the potentialities of vacuum insulating structures, since the evacuated envelope itself usually includes two sealed walls and the inner and outer walls of the refrigerator are then employed in addition thereto. Accordingly, it would be advantageous from a cost standpoint to employ one or both walls of the evacuated envelope as a corresponding wall or walls of the refrigerator cabinet itself. Such a use of the evacuated envelope necessarily requires that the exposed surface thereof present a pleasing appearance and not be subject to undesirable deformities.

In vacuum insulating structures of the type here considered edge losses, that is, heat leakage along the edges of the vacuum insulating structure or panel between the two walls thereof, present a substantial problem. In order to minimize such edge losses, one of the walls of the envelope may be made of a material of low thermal conductivity, for example, stainless steel. Moreover, if the material is to be used as an exposed surface, stainless steel offers the advantage that no finishing operation may be required. However, stainless steel is very much more expensive than the more common low carbon steel widely used for other purposes. Hence, the use of a sheet of stainless steel of sufficient thickness to resist undesirable deformation under the differential pressure resulting from evacuation of the panel would introduce a major cost obstacle. Such deformation may readily occur where a thin sheet is employed because the glass fiber filler material, which, as described and claimed in the aforementioned Strong & Bundy application, provides desirable properties in other respects, is to some extent compressible under the external atmospheric pressure and does not necessarily present a flat, smooth surface for supporting the adjacent wall.

In accordance with my invention, I provide a vacuum insulated structure which employs a thin sheet of material for the exposed surface and at the same time includes an arrangement for supporting this sheet in such a manner that a smooth surface having excellent appearance characteristics is secured. In one form of my invention, the vacuum insulating structure is employed in a door with the thin sheet providing one exposed surface of the door.

It is an object of my invention to provide a cabinet structure including an improved insulating component.

It is another object of my invention to provide a vacuum insulating structure including an improved arrangement for obtaining a smooth exposed surface.

It is a further object of my invention to provide a vacuum insulating structure including a composite wall for securing at lower cost a smooth exposed surface.

It is still another object of my invention to provide an improved vacuum insulating structure including an arrangement for using the vacuum itself to secure a smooth exposed surface.

Further objects and advantages of my invention will become apparent as the following description proceeds and the features of novelty which characterize my invention will be pointed out with particularity in the claims annexed to and forming a part of this specification.

In carrying out the objects of my invention, a sealed envelope is provided which includes at least one thin sheet and which includes a compressible filler material for supporting the walls of the envelope against external atmospheric pressure. The thin sheet is caused to present a smooth, exposed surface by providing adjacent at least a portion thereof and between the sheet and the filler material a thicker reinforcing sheet. The thin sheet is held in flush engagement with the reinforcing sheet by the differential external pressure resulting from the evacuation of the envelope. The thin sheet is made of material of low thermal conductivity while the reinforcing sheet may be made of a material of higher thermal conductivity.

For a better understanding of my invention, reference may be had to the accompanying drawing in which Fig. 1 is an elevation view of a refrigerator incorporating an embodiment of my invention.

Figure 2:
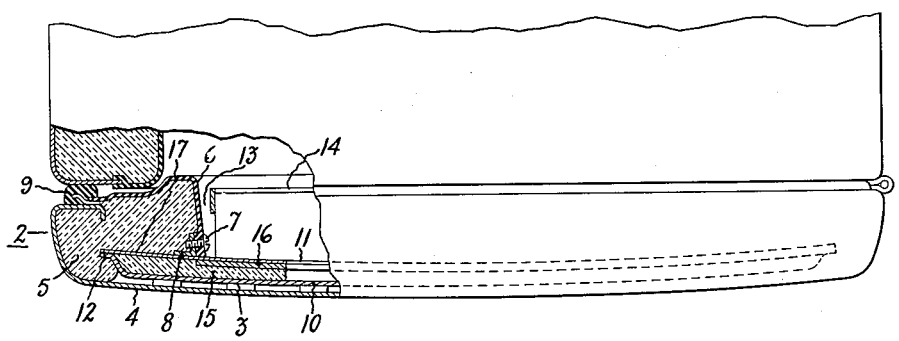

Fig. 2 is a plan view partly in section of a portion of the refrigerator illustrating details of one embodiment of my invention.

Referring to the drawing, there is shown a refrigerator cabinet which includes a stationary storage structure 1 and a door 2 hinged thereto for closing the access opening of the storage compartment.

As shown in detail in Fig. 2, the door is constructed to include a vacuum insulating structure or panel 3. The door itself includes a pan-shaped outer wall 4 within which is disposed the panel 3. Adjacent the marginal edges of the panel 3 and within the confines of the peripheral portions of the pan-shaped outer wall 4 there is provided a mass of atmospheric insulation, for example, glass fiber insulating material 5. To enclose the insulating material 5 and provide a finished appearance for the door, a breaker frame 6 of a material of low heat conductivity, such as a suitable plastic material, is provided. This breaker frame 6 is mounted in position by means of screws, one of which is shown at 7, engaging a supporting bracket 8 which is welded or otherwise secured to the panel 3. The other edge of the breaker frame 6 is received in a gasket 9.

The vacuum insulating structure or panel 3 includes two spaced walls 10 and 11 which are sealed together at their edges 12 in any suitable manner as by welding. The construction disclosed provides a deeply recessed central portion 13 at the interior of the door for conveniently receiving a plurality of shelves 14 mounted on the door for storing food. The inner wall or sheet 11 of the panel 3 is, as can be seen, exposed to view when the door is opened.

The structure thus far described is not part of my invention but is described and claimed in the copending applications of David W. Evans, Serial No. 297,959, filed July 9, 1952, and of Robert A. King, Serial No. 297,938, filed July 9, 1952, both assigned to the General Electric Company, the assignee of the present invention. My invention relates to a particular construction of the insulating structure or panel 3 which gives an improved appearance to the exposed inner wall 3 thereof at an advantageous cost and with a minimizing of edge losses and to the particular relationship of a panel as constructed and the remainder of the door structure.

As mentioned previously, the vacuum insulating structure or panel 3 includes spaced walls 10 and 11 which are sealed at their edges 12. The space between these walls is evacuated. In order to support the walls against external atmospheric pressure after evacuation of the space therebetween, a filler material 15, which may be of the type described and claimed in the aforementioned Strong & Bundy application, is placed between the walls 10 and 11. This filler material 15, which is composed of glass fiber insulating material, is to some extent compressible under the influence of the external atmospheric pressure. Hence, unless the sheet or wall 11 is thick and strong enough, its exposed surface could present material deformation detracting from the appearance thereof. In order to minimize heat leakage between the walls 10 and 11 of the panel around the edges thereof, the inner, exposed wall 11 is preferably made from a material of low thermal conductivity. Stainless steel, because of the elimination of the necessity of providing a finish therefor, is a convenient material for this purpose. The other wall 10 of the panel is made preferably of a material of higher thermal conductivity but much less cost, for example, the low carbon steel commonly used for many purposes.

Stainless steel is a somewhat expensive material and the utilization of a sheet 11 of stainless steel of sufficient thickness to resist deformation as a result of atmospheric pressure forcing the sheet against the filler material which does not have a smooth, flat, adjacent surface would be prohibitive. In accordance with my invention, a thin sheet of stainless steel which of itself does not have sufficient strength to resist deformation under the external atmospheric pressure is employed as the wall 11. This sheet may be approximately .010 inch in thickness. In order to overcome the tendency toward deformation of this thin exposed sheet 11, a thicker reinforcing sheet 16 is disposed adjacent thereto and between the thin sheet 11 and the filler material 15. Ths reinforcing sheet 16 is preferably composed of a relatively inexpensive material such as low carbon steel and is substantially thicker than the sheet 11, being, for example, .030 inch in thickness. Under the influence of external atmospheric pressure, the thin sheet 11 is then pressed firmly against the flat, thicker, reinforcing sheet 16 with the result that it adapts itself exactly to the flat surface of the reinforcing sheet 16 and thereby presents a smooth, exposed surface which is pleasing in appearance. The differential pressure resulting from the evacuation of the panel 3 is thereby itself employed for urging the thin sheet against the reinforcing sheet.

In the form of invention illustrated, the reinforcing sheet 16 covers only the central portion of the thin sheet 11. Specifically, in the embodiment shown, this reinforcing sheet 16 extends, as indicated, only to the inner edge of the breaker frame 6; in other words, the reinforcing plate 16 is substantially coincidental with the area of the exposed surface of the thin sheet 11. It thus provides for reinforcing and, hence, for elimination of deformities only in that portion of the thin sheet 11 where such elimination of deformities is material. The sheet 11 includes a marginal edge 17 between the perimeter of the reinforcing sheet 16 and the sealed edges 12 of the walls 10 and 11. Hence, while the reinforcing sheet 16 of a material of higher thermal conductivity increases to some extent, the heat conduction along the inner wall of the panel 3, the thin edge portion 17 of the material of low thermal conductivity is interposed to provide a thermal break minimizing the heat transfer between the walls 10 and 11 around the edges thereof, that is, minimizing edge losses.

While I have shown and described a specific embodiment of my invention, I do not desire my invention to be limited to the particular constructions shown and described, and I intend by the appended claims to cover all modifications within the spirit and scope of my invention.

What I claim as new and desire to secure by Letters Patent of the United States is:

1. A door structure comprising a pan-shaped outer wall including an inwardly extending peripheral portion, a vacuum insulating structure including two spaced walls, one of said last named walls being composed of a thin sheet, a compressible filler material between said walls for supporting said walls against external atmospheric pressure when the space between said walls is evacuated, said insulating structure being disposed within said pan-shaped outer wall with said thin sheet facing away from said pan-shaped wall and forming at least a portion of the inner wall surface of said door structure, a breaker frame enclosing the space between said peripheral portion of said outer wall and said thin sheet, one edge of said breaker frame engaging said thin sheet along a boundary spaced inwardly from the marginal edge thereof whereby the area between said one edge of said breaker frame and said marginal edge of said thin sheet is concealed, and a reinforcing sheet between said thin sheet and said filler material, said reinforcing sheet extending only to said edge of said breaker frame whereby said reinforcing sheet is spaced from the other of said walls of said vacuum insulating structure and supports only the exposed area of said thin sheet, said reinforcing sheet being substantially thicker than said thin sheet, said thin sheet being pressed smoothly against said reinforcing sheet by external atmospheric pressure.

2. A door structure comprising a pan-shaped outer wall including an inwardly extending peripheral portion, a vacuum insulating structure including two spaced walls, one of said last named walls being composed of a thin sheet of stainless steel, a compressible filler material between said walls for supporting said walls against external atmospheric pressure when the space between said walls is evacuated, said insulating structure being disposed within said pan-shaped outer wall with said thin sheet facing away from said pan-shaped wall and forming an exposed inner wall portion of said door structure, a breaker frame enclosing the space between said peripheral portion of said outer wall and said thin sheet, one edge of said breaker frame engaging said thin sheet along a boundary spaced inwardly from the marginal edge thereof whereby the area between said one edge of said breaker frame and said marginal edge of said thin sheet is concealed, and a reinforcing sheet between said thin sheet and said filler material, said reinforcing sheet being composed of low carbon steel and extending only to said edge of said breaker frame whereby said reinforcing sheet is spaced from the other of said walls of said vacuum insulating structure and supports only the exposed area of said thin sheet, said reinforcing sheet being substantially thicker than said thin sheet, said thin sheet being pressed smoothly against said reinforcing sheet by external atmospheric pressure.

3. A door structure comprising a pan-shaped outer wall including an inwardly extending peripheral portion, a vacuum insulating structure including two spaced walls, one of said last named walls being composed of a thin sheet of stainless steel approximately .010 inch thick and forming the inner wall of said door structure, a compressible filler material between said walls for supporting said walls against external atmospheric pressure when the space between said walls is evacuated, said insulating structure being disposed within said pan-shaped outer wall with said thin sheet facing away from said pan-shaped wall, a breaker frame enclosing the space between said peripheral portion of said outer wall and said thin sheet, one edge of said breaker frame engaging said thin sheet along a boundary spaced inwardly from the marginal edge thereof whereby the area between said one edge of said breaker frame and said marginal edge of said thin sheet is concealed, and a reinforcing sheet between said thin sheet and said filler material, said reinforcing sheet being composed of low carbon steel approximately .030 inch thick and extending only to said edge of said breaker frame whereby said reinforcing sheet is spaced from the other of said walls of said vacuum insulating structure and supports only the exposed area of said thin sheet, said thin sheet being pressed smoothly against said reinforcing sheet by external atmospheric pressure.

References Cited in the file of this patent

UNITED STATES PATENTS

| | | |
|---|---|---|
| 2,047,996 | Crosley, Jr. et al. | July 21, 1936 |
| 2,164,143 | Munters | June 27, 1939 |

FOREIGN PATENTS

| | | |
|---|---|---|
| 517,149 | Great Britain | Jan. 22, 1940 |